United States Patent [19]

Rosenthal et al.

[11] 3,899,576

[45] Aug. 12, 1975

[54] CYCLIC PROCESS FOR THE PRODUCTION OF HYDROGEN PEROXIDE

[75] Inventors: Rudolph Rosenthal, Broomall; Joseph A. Kieras, Lincoln University, both of Pa.

[73] Assignee: Atlantic Richfield Company, Los Angeles, Calif.

[22] Filed: Aug. 20, 1973

[21] Appl. No.: 389,935

[52] U.S. Cl. ............................ 423/586; 423/587
[51] Int. Cl.² ................................... C01B 15/02
[58] Field of Search ......... 423/586, 587; 260/429.5, 260/610 R; 252/431 R

[56] References Cited
UNITED STATES PATENTS
3,653,832  4/1972  Turner ........................ 260/610 R
3,737,518  6/1973  Bonetti ........................... 423/587

OTHER PUBLICATIONS
Milas et al.: J. Am. Chem. Soc. 68, 205–208 (1946).
Griffith: J. Chem. Soc. (1964), p. 5248–5253.

Primary Examiner—Oscar R. Vertiz
Assistant Examiner—Wayne A. Langel
Attorney, Agent, or Firm—Delbert E. McCaslin

[57] ABSTRACT

Production of hydrogen peroxide by treating peroxy titanium complexes having one peroxy oxygen group per titanium atom with excess alkali metal hydroxide to obtain a solution of a complex containing more than one peroxy group per titanium atom and a titanium oxide precipitate, separation of the precipitate, acidification of the complex solution to release the hydrogen peroxide and produce the titanium complex having one peroxy oxygen group per titanium atom, removal of the hydrogen peroxide from the solution, conversion of the titanium oxide precipitate with an organic hydroperoxide and sulfuric acid to produce the peroxy titanium complex having one peroxy oxygen group per titanium atom, and combining the two solutions of peroxytitanium complex of one peroxy group per titanium atom for recycle to the process.

8 Claims, No Drawings

CYCLIC PROCESS FOR THE PRODUCTION OF HYDROGEN PEROXIDE

BACKGROUND OF THE INVENTION

Hydrogen peroxide, although relatively expensive, has attained the status of a large volume chemical because of its value in a wide variety of uses. A major use is as a bleaching agent for such diverse materials, as hair, groundwood and wood pulp. It is used as an oxidizer for vat dyes, a hypo eliminator in photography, for separation of metal ions by selective oxidation, an analytical reagent, a depolymerization agent in modification of resins and has many other uses.

The methods of preparation used and proposed are almost as numerous and varied as are the uses of the compound. A method presently in use, known as the anthraquinone process, involves the alternate oxidation and reduction of anthraquinones.

In a recent patent, U.S. Pat. No. 3,737,518 (1973) to Bonetti et al, hydrogen peroxide is prepared from water and an organic hydroperoxide in the presence of acid at temperatures ranging from 60° C. to about 130° C.

The present invention provides an alternative route for the preparation of hydrogen peroxide from organic hydroperoxides which is carried out at lower temperatures, for example at about 50° C.

The value of these methods for the preparation of hydrogen peroxide is based on the use of a relatively cheap source of peroxy oxygen which has recently become commercially available, i.e. organic hydroperoxides produced by the thermal oxidation of hydrocarbons with molecular oxygen. After giving up their peroxy oxygen these hydroperoxides are reduced to their corresponding alcohols which may be valuable as such or which when dehydrated give valuable monomers.

SUMMARY OF THE INVENTION

In accordance with the present invention a peroxytitanium complex having one peroxy oxygen group per titanium atom, preferably produced by reacting an organic hydroperoxide with titanium sulfate in a highly acidic aqueous solution, i.e. at a pH of below 1.5 and preferably below 0.6 – 0.8, is contacted with an excess of an aqueous alkali metal hydroxide sufficient to give a solution having a pH of from 13 to 14. Upon completion of the reaction about one-half of the titanium is precipitated as the oxide leaving the remainder of the titanium as a solution of a complex containing two peroxy oxygen groups per titanium atom. After separation of the precipitated titanium oxide the solution is re-acidified and the original peroxytitanium complex having one peroxy oxygen group per titanium atom is formed and the remaining peroxy oxygen is converted to hydrogen peroxide which is recovered from solution by any suitable means such as distillation or ether extraction.

The precipitated titanium oxide is contacted with an organic hydroperoxide and sulfuric acid to convert the oxide to the peroxytitanium complex having one peroxy oxygen group per titanium atom. This solution is combined with the peroxytitanium complex containing solution from which the hydrogen peroxide was separated and the cycle repeated.

It is an object of this invention therefore to provide a method for the production of hydrogen peroxide at low temperatures.

It is another object of this invention to provide a method for the production of hydrogen peroxide employing a peroxytitanium complex as the source of the peroxy oxygen.

It is another object of this invention to provide a method for the production of hydrogen peroxide wherein a peroxytitanium complex having one peroxy group per titanium atom is converted to a peroxytitanium complex having two peroxy oxygen groups per titanium atom, together with titanium oxide, converting the second complex to hydrogen peroxide and the peroxytitanium complex having one peroxy oxygen group per titanium atom and recovering the hydrogen peroxide.

It is another object of this invention to reconvert the titanium oxide formed in the process to the peroxytitanium complex having one peroxy oxygen group per titanium atom and combining said complex-containing solution with the solution containing the same complex from which the hydrogen peroxide has been separated and recycling said complex containing solutions to the process.

Other objects of the invention will be apparent from the description of the invention which follows and from the claims.

DESCRIPTION OF THE INVENTION

In a co-pending application of Rosenthal et al., Ser. No. 390,152, filed Aug. 20, 1973, entitled PRODUCTION OF PEROXYTITANIUM COMPLEXES FROM ORGANIC HYDROPEROXIDES there is described a method for the production of peroxytitanium complexes having one peroxy oxygen group per titanium atom by reacting titanium sulfate or titanium oxide which has been converted to the sulfate with an organic hydroperoxide in a highly acidic medium, i.e. one haaving a pH of less than 1.5 and preferably less than 0.6 – 0.8 with the best results being obtained at a pH of 0 to 0.4. The reaction can be carried out at temperatures ranging from 0° to 100° C. but preferably from 20° C. to 80° C.

The organic hydroperoxides preferred are those having the general formula ROOH wherein R is an alkyl, aralkyl or cycloalkyl radical. Such radicals may also be substituted with other non-reactive groups such as the halogens, nitro groups and the like. Preferably those hydroperoxides having from 4 to 12 carbon atoms are preferred, in particular, tertiary butyl hydroperoxide, tertiary amyl hydroperoxide, ethylbenzene hydroperoxide, cyclohexyl hydroperoxide and cumene hydroperoxide. Other hydroperoxides such as 1,2,3,4-tetrahydronaphthalene hydroperoxide and diisopropyl ketone hydroperoxide also can be used but are less preferred. In general those hydroperoxides most readily available commercially and whose corresponding alcohols are commercially useful either as such or when dehydrated to a polymerizable monomer are preferred.

The hydroperoxide can be pure or it can be in the form of the crude oxidate as obtained by the aforementioned thermal oxidation of the corresponding hydrocarbon using molecular oxygen usually in the absence of catalyst. Likewise oxidates which have been concentrated by removal of unreacted hydrocarbon and/or a portion or preponderance of the other oxygenated products can be used.

The complexes thus produced are reddish in color and as has been stated contain one active oxygen atom (peroxy oxygen group) per titanium atom. In order to produce this complex it is preferred to use a mole ratio of titanium sulfate to organic hydroperoxide of 1:1, however larger or smaller mole ratios can be used but are not attractive from an economical standpoint. It is also generally preferred to use a small amount of water, i.e. a weight ratio of titanium sulfate to water of 1:1 to 1:3 since this gives a solution which is easy to handle with respect to its viscosity. The time required for the production of such complex is dependent upon the pH and temperature employed. With the lowest pH's and higher temperatures, times as short as 15 minutes are suitable, however in general, times ranging from 45 minutes to 1 hour are employed. The solution can be neutralized with sodium carbonate, for example to precipitate a solid peroxytitanium hydrate, which after filtering and water washing generally contains from about 6 to 8 weight per cent active oxygen. This solid is characteristically yellow in color compared with the reddish color of the original complex. This yellow solid when treated with excess alkali metal hydroxide solution sufficient to provide a pH of from 13 to 14, partially dissolves giving a precipitate of the titanium oxide and a solution of a peroxytitanium complex having two peroxy oxygen groups per titanium atom. In general about one-half of the titanium is precipitated as the oxide with the other one-half of the titanium remaining in solution as the complex. After filtering to separate the oxide precipitate, the peroxytitanium complex solution is re-acidified preferably with sulfuric acid which converts the peroxytitanium complex having two peroxy oxygen groups per titanium atom back to the red peroxytitanium complex having one peroxy oxygen group per titanium atom and the other active oxygen is converted into hydrogen peroxide. The amount of sulfuric acid or other acid should be sufficient to provide the highly acidic solution, i.e. a pH of less than 1.5 and preferably below 0.6 – 0.8. The hydrogen peroxide is separated from this solution either by distillation or by extraction with diethyl ether for example.

The titanium oxide precipitate is treated with sulfuric acid to convert it to the titanium sulfate which in turn is treated with additional organic hydroperoxide to regenerate the red peroxytitanium complex having one peroxy oxygen group per titanium atom. This step is also carried out in the presence of sufficient acid to provide the desired pH of less than 1.5 and preferably less than 0.6 – 0.8. If any sodium sulfate precipitates it can be removed from the solution before recycle. The complex solution thus produced is combined with the complex solution from which the hydrogen peroxide has been removed and the cycle is then repeated. In this process because of its commercial availability tertiary butyl hydroperoxide is the preferred organic hydroperoxide, likewise sulfuric acid is the preferred acid and sodium hydroxide is the preferred base.

It should be pointed out however, it is unnecessary to neutralize the red peroxytitanium complex solution with sodium carbonate to precipitate the peroxytitanium hydrate but instead sufficient sodium hydroxide is added to the red peroxytitanium complex solution containing one peroxy oxygen atom per titanium atom to produce the titanium oxide precipitate and the yellow solution containing the peroxytitanium complex having two peroxy oxygen groups per titanium atom which solution will have a pH of from 13 to 14. Again after separating the titanium oxide precipitate and acidifying the yellow complex solution the red complex is produced together with the hydrogen peroxide as described above.

In order to illustrate the invention in greater detail the following Examples are provided.

EXAMPLE I

Tertiary butyl hydroperoxide was reacted with an aqueous slurry of titanium sulfate at 65° C. for 3 hours. The solution was neutralized with sodium carbonate and the solid peroxytitanium hydrate filtered and water washed. The dried solid analyzed 6.6 weight percent active oxygen. Ten grams of the yellow solid was treated with 15 g NaOH in 45 g water for 40 minutes at 50° C. The solution analyzed 0.51 weight percent active oxygen. This corresponds to about 50 percent of the original active oxygen used. The ratio of peroxy oxygen to titanium was about 2:1. When this solution was acidified with 20 weight percent sulfuric acid and extracted with ether, it was shown that hydrogen peroxide was present in the acid solution.

EXAMPLE II

A slurry of 10 g of peroxytitanium hydrate prepared from tertiary butyl hydroperoxide and titanium sulfate as described in Example I was neutralized with sodium carbonate and washed to analyze 7.3 weight percent active oxygen. This was heated at 50° C. for 30 minutes with 15 g sodium hydroxide and 45 g of water. The liquid analuzed 0.62 weight percent active oxygen. This liquid was treated with an additional 10 g of the peroxytitanium hydrate at 50° C. for 30 minutes. The liquid then analyzed 1.19 weight percent active oxygen. The solution was treated with an additional 10 g of peroxytitanium hydrate at 50° C. for 30 minutes and gave a solution analyzing 1.52 weight percent active oxygen.

These runs demonstrate that the active oxygen content of the basic solution can be increased by recycle of the basic solution, or by counter-current extraction techniques. Upon acidification of this solution followed by ether extraction it was found that hydrogen peroxide was released on acidification.

The temperatures employed through the process can range from about 0° C. to about 60° C. but preferably from about 20° C. to 55° C. The amount of aqueous alkali solution employed in the conversion of the peroxytitanium complex is a minimum of 1 mole of alkali metal hydroxide per titanium atom in addition to that required for neutralization of any acid present in the system. As has been pointed out the desired pH range of the basic solution is from 13 to 14. The concentration of the alkali metal hydroxide in the aqueous solution can range from 10 to 50 weight per cent.

Although additional base may be employed there is no advantage in using an excess. Likewise potassium hydroxide for example can be substituted for sodium hydroxide but is more expensive and does not give any additional advantages. The acidification step can be carried out with any mineral acid, however, sulfuric acid is preferred because of its low cost and moreover sufficient acid is utilized to convert the titanium oxide to the sulfate for reconversion of the titanium sulfate to the starting peroxytitanium complex as has been described.

We claim:

1. A method for the production of hydrogen peroxide which comprises treating a peroxy titanium complex produced by reacting titanium sulfate with an organic hydroperoxide having from 4 to 12 carbon atoms and characterized by the formula ROOH wherein R is an alkyl, aralkyl or cycloalkyl radical at a temperature in the range of from 0°C. to 100°C., and at a pH of less than 1.5 and having one peroxy oxygen group per titanium atom with excess aqueous alkali metal hydroperoxide solution at a temperature in the range of from 0°C. to 60°C. for a time sufficient to obtain a solution of a complex containing more than one peroxy group per titanium atom and a titanium oxide precipitate, separating said precipitate, acidifying said complex solution containing more than one peroxy oxygen group per titanium atom to produce the titanium complex having one peroxy oxygen group per titanium atom and hydrogen peroxide and recovering the hydrogen peroxide from said complex solution.

2. The method according to claim 1 wherein the alkali metal hydroxide is sufficient to give a solution having a pH of from 13 to 14 and containing a peroxytitanium complex having two peroxy oxygen groups per titanium atom and said treating temperature is in the range of from 20° C. to 55° C.

3. The method according to claim 2 wherein said alkali metal hydroxide is sodium hydroxide.

4. The method according to claim 2 wherein said solution containing said peroxytitanium complex having two peroxy oxygen groups per titanium atom is acidified with sufficient sulfuric acid to give a solution having a pH of less than 1.5 of a peroxy titanium complex having one peroxy oxygen group per titanium atom and said hydrogen peroxide.

5. The method according to claim 1 wherein the temperature is in the range of from 20°C. to 80°C. and the pH is less than 0.6 to 0.8.

6. A process for the production of hydrogen peroxide which comprises treating an aqueous solution of a peroxy titanium complex produced by reacting titanium sulfate with an organic hydroperoxide having from 4 to 12 carbon atoms and characterized by the formula ROOH wherein R is an alkyl, aralkyl or cycloalkyl radical at a temperature in the range of from 0°C. to 100°C., and at a pH of less than 1.5 and having one peroxy oxygen group per titanium atom with sufficient aqueous alkali metal hydroxide solution at a temperature of from 0°C. to 60°C. and for a time sufficient to obtain a solution of a complex containing two peroxy oxygen groups per titanium atom and a titanium oxide precipitate, separating said precipitate, acidifying said complex solution containing two peroxy oxygen groups per titanium atom to a pH of less than 1.5 and thus producing a solution of said titanium complex having one peroxy oxygen group per titanium atom and hydrogen peroxide, recovering the hydrogen peroxide from said complex solution, treating said titanium oxide precipitate with sulfuric acid to convert said oxide to titanium sulfate, treating said sulfate with water and at least one mole of organic hydroperoxide per mole of titanium sulfate at a pH of less than 1.5 and at a temperature in the range of from 0°C. to 100°C. to convert said sulfate to an aqueous solution of the peroxytitanium complex having one peroxy oxygen group per titanium atom, combining said solutions of peroxy titanium complex having one peroxy oxygen group per titanium atom and recycling said combined solutions to the beginning of said process.

7. A process according to Claim 6 wherein said alkali metal hydroxide is sodium hydroxide, said hydroxide treating temperature is in the range of from 20°C. to 55°C., said treating temperature with said hydroperoxide is in the range of from 20°C. to 80°C. and said pH is less than 0.6 to 0.8.

8. The process according to claim 7 wherein said organic hydroperoxide is tertiary butyl hydroperoxide.

* * * * *